United States Patent
Patterson et al.

(10) Patent No.: US 7,962,520 B2
(45) Date of Patent: Jun. 14, 2011

(54) CLUSTER STORAGE USING DELTA COMPRESSION

(75) Inventors: R. Hugo Patterson, Mountain View, CA (US); Kai Li, Seattle, WA (US); Ming Benjamin Zhu, Cedar Park, TX (US); Sazzala Venkata Reddy, Sunnyvale, CA (US); Umesh Maheshwari, San Jose, CA (US); Edward K. Lee, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 498 days.

(21) Appl. No.: 12/082,244

(22) Filed: Apr. 9, 2008

(65) Prior Publication Data

US 2008/0294660 A1    Nov. 27, 2008

Related U.S. Application Data

(60) Provisional application No. 60/925,514, filed on Apr. 19, 2007, provisional application No. 60/923,066, filed on Apr. 11, 2007, provisional application No. 60/922,996, filed on Apr. 11, 2007.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| 2003/0097359 | A1 | 5/2003 | Ruediger |
| 2005/0060643 | A1 | 3/2005 | Glass et al. |
| 2005/0086246 | A1* | 4/2005 | Wood et al. ................. 707/101 |

OTHER PUBLICATIONS

Hong et al.; "Duplicate Data Elimination in a SAN File Syste"; Proceedings of the 21$^{st}$ IEEE/12$^{th}$ NASA Goddard Conference on Mass Storage Systems and Technologies (MSST 2004); Apr. 2004; Goddard Space Flight Center, Greenbelt, Maryland 20771.

You et al.; "Deep Store: An Archival Storage System Architecture"; IEEE Proceedings of the 21$^{st}$ International Conference on Data Engineering (ICDE 2005); UC Santa Cruz, Jack Baskin School of Engineering , Santa Cruz, CA 95064.

Biggar, H.; "Experiencing Data De-Duplication: Improving Efficiency and Reducing Capacity Requirements"; Enterprise Strategy Group White Paper, Feb. 2007.

* cited by examiner

*Primary Examiner* — Isaac M Woo
(74) *Attorney, Agent, or Firm* — Van Pelt, Yi & James LLP

(57) ABSTRACT

Cluster storage is disclosed. A data stream or a data block is received. The data stream or the data block is broken into segments. For each segment, a cluster node is selected, and in the event that a similar segment to the segment is identified that is already managed by the selected cluster node, a reference to the similar segment and a delta between the similar segment and the segment is caused to be stored on the selected cluster node.

42 Claims, 8 Drawing Sheets

CLUSTER STORAGE USING DELTA COMPRESSION

This application claims priority to U.S. Provisional Patent Application No. 60/925,514 entitled SUBSEGMENTING FOR EFFICIENT STORAGE, RESEMBLANCE DETERMINATION, AND TRANSMISSION filed Apr. 19, 2007 which is incorporated herein by reference for all purposes.

This application claims priority to U.S. Provisional Patent Application No. 60/923,066 entitled CLUSTER STORAGE USING SUBSEGMENTING filed Apr. 11, 2007 which is incorporated herein by reference for all purposes.

This application claims priority to U.S. Provisional Patent Application No. 60/922,996 entitled CLUSTER STORAGE USING DELTA COMPRESSION filed Apr. 11, 2007 which is incorporated herein by reference for all purposes.

BACKGROUND OF THE INVENTION

Scaling data storage systems to hold more information is important as data storage users continue to increase their desired storage requirements. One approach is to aggregate multiple individual storage systems into a cluster that combines the capacity and performance of the multiple individual nodes into one. However, in order to scale smoothly, each node of the cluster must be used appropriately in terms of data stored on the node and processing and throughput required by the node.

Some storage systems optimize storage capacity by eliminating identical copies of stored data. In some cases, stored data is divided into segments. A new segment that is desired to be stored is first compared against those segments already stored. If an identical segment is already stored on the system, a reference to that segment is stored instead of storing the new segment. This is referred to as identity compression.

Other storage systems optimize storage capacity by comparing a new segment that is desired to be stored against those segments already stored and looking for a similar though not necessarily identical segment. If a similar segment is already stored on the system, a delta between the old and new segment is computed and a reference to the old segment and the delta is stored in place of the entire new segment. This is referred to as delta compression.

In using either identity or delta compression with a cluster, in order to achieve high efficiency and find a similar segment each node ideally searches all stored segments in all nodes and in addition can reference, using an index, all segments in all nodes. The ability to search and index all segments on all nodes poses problems in scaling to a large number of nodes because each node must maintain its ability to search and index over all segments stored on each node of the cluster and the inter-node communication can reduce performance.

It is useful in scaling storage using a cluster approach to divide the segments among the nodes so that a single node does not need to maintain its ability to search and index over all segments stored on each node of the cluster and to reduce the communication among the nodes. In identity compression, such division is sometimes based on a fingerprint computed over the segment, the fingerprints being divided into groups or buckets of fingerprints, and the buckets being assigned to nodes so that, given a segment, a fingerprint can be computed and the node that would have the segment, if it already exists in the cluster, can be identified. Because each node only stores some of the segments, each node only needs to index some of the segments.

Unfortunately, in delta compression, fingerprints of segments are not useful for assigning segments to nodes because similar segments do not, in general, have similar fingerprints. Thus, assignment based on fingerprints would usually result in similar segments being stored on different nodes. A cluster which limited its search for a similar segment to a single node would often fail to find a similar segment even when one exists in the cluster.

BRIEF DESCRIPTION OF THE DRAWINGS

Various embodiments of the invention are disclosed in the following detailed description and the accompanying drawings.

DETAILED DESCRIPTION

Figure 1:
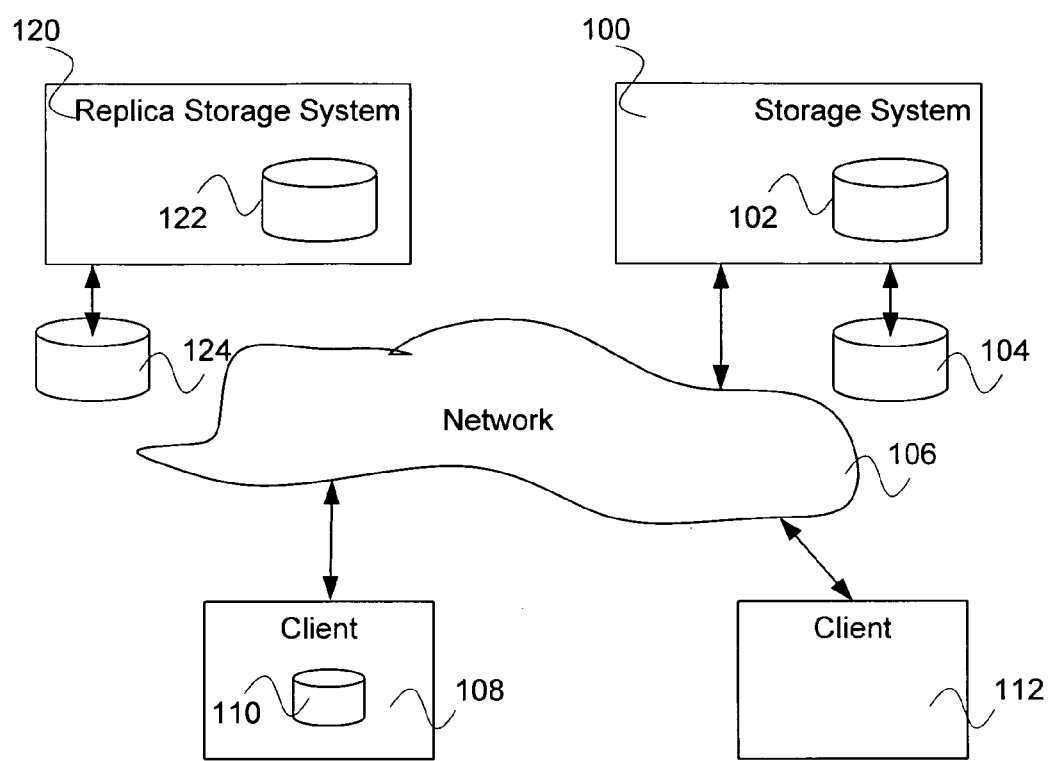
FIG. 1 is a block diagram illustrating an embodiment of a system for cluster storage using delta compression.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cluster storage is disclosed. A storage system uses a cluster of nodes to store in-coming data. In-coming data is segmented. Each segment is characterized for assignment for storage on a given node. On the given node of the cluster, segments are stored in a manner that deduplicates segment storage. Sorting segments into a plurality of nodes reduces the number of segments to be searched for deduplication and reduces the size of the segment index required on a node. It also reduces the overhead of network traffic for inter-node communication because the nodes need to exchange less information to deduplicate and store the data.

Segments are deduplicated on each node of the cluster using delta compression. Delta compression allows the use of large segments for distributing efficiently to nodes so that sequential bytes are stored close to each other on disk. Delta compression efficiently stores segments that are similar to each other by storing one base and, for other similar segments, storing only a delta from the base along with a reference to the base. If a segment is not similar to a previously stored base, the new segment is stored as a new base and possibly a delta from that base.

In some embodiments, a node is selected for a given segment by finding a node that manages or stores similar segments to the given segment. In some embodiments, the node is selected using a sketch or other resemblance measure to identify if the node manages or stores similar segments. In various embodiments, a cluster node is associated with the segment based at least in part on a computed hash of all or some of the content of the segment, on a function of less than all the bytes in the segment (e.g., the initial bytes, the ending bytes, algorithmically determined sample of bytes, etc.), on a sketch of the segment, on a content based tag associated with the segment, determining which cluster nodes have likely similar segments, on node capacities (e.g., remaining storage capacity, used storage capacity, etc.) or capabilities, or any other appropriate available resource associated with the node.

In some embodiments, a sketch or other resemblance measure is used to identify a subset of segments to search through for a similar match on the node. In this case, the subset comprises likely similar segments and is used to more efficiently locate the similar segments by reducing the search space within the managed or stored segments. Resemblance is determined by comparing a summary feature set of a first segment with a summary feature set of a second segment. A summary feature set is determined by selecting a plurality of either fixed length or variable length parts or shingles of a first segment; for each shingle, computing a plurality of values by applying a set of functions to each shingle; and from all the values computed for all the shingles, selecting a first subset of values. In some embodiments, the first subset of values is used in determining resemblance between the first segment and a second segment.

In some embodiments, the segments are created based at least in part on the content of the data in the stream. In some embodiments, the segments are created using an anchoring function. In various embodiments, the anchoring function includes computing a hash of a sliding window of bytes, determining if the computed hash meets one or more predetermined criteria, and/or establishing a boundary in an algorithmic manner in or around the sliding window of bytes. In some embodiments, a window is defined and a minimum or maximum value of a computed function (e.g., a hash or other function) or of a value of data anywhere within the window is used to define a segment or subsegment. In some embodiments, a window is defined that includes a plurality of subsegments. A hash of the first, all, or a selection of bytes of each subsegment is calculated and the maximum or minimum hash value within the window is selected to begin a next segment.

FIG. 1 is a block diagram illustrating an embodiment of a system for cluster storage using delta compression. In the example shown, storage system 100 stores data for clients represented in FIG. 1 by client 112 and client 108. A client may have local storage device in addition to local memory. For example, client 108 has storage 110 whereas client 112 does not have a local storage device. Storage system 100 stores data either using internal storage device 102 or attached external storage device 104.

Storage system 100 communicates with clients via network 106. Network 106 comprises one or more of the following: a local area network, a wide area network, a storage area network, a wired network, a wireless network, the Internet, a fiber network, or any other appropriate network enabling communication. Storage system 100 communicates with replica system 120 via network 106 as well. Replica system 120 includes internal storage device 122 and is connected to external storage device 124.

Replica system 120 stores all or a portion of data stored on storage system 100. Initially, all or the portion of data stored on storage system 100 is replicated on replica system 120 by sending appropriate data via network 106. After the initial seeding, replica system 120 is updated by sending from storage system 100 new data. Updating can be continuous, sent in bursts on a regular schedule, when the amount of data exceeds a certain size, or at other appropriate times. In various embodiments, replica system 120 receives a data stream or data blocks, data segments, segments that have not previously been stored, and/or bases (or references to bases) and deltas to previously stored segments instead of all segments of a data stream or data block. In some embodiments, replica system 120 replicates storage system 100 by receiving a copy of each of the cluster nodes.

In various embodiments, storage devices 102, 104, 122, and 124 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 2:
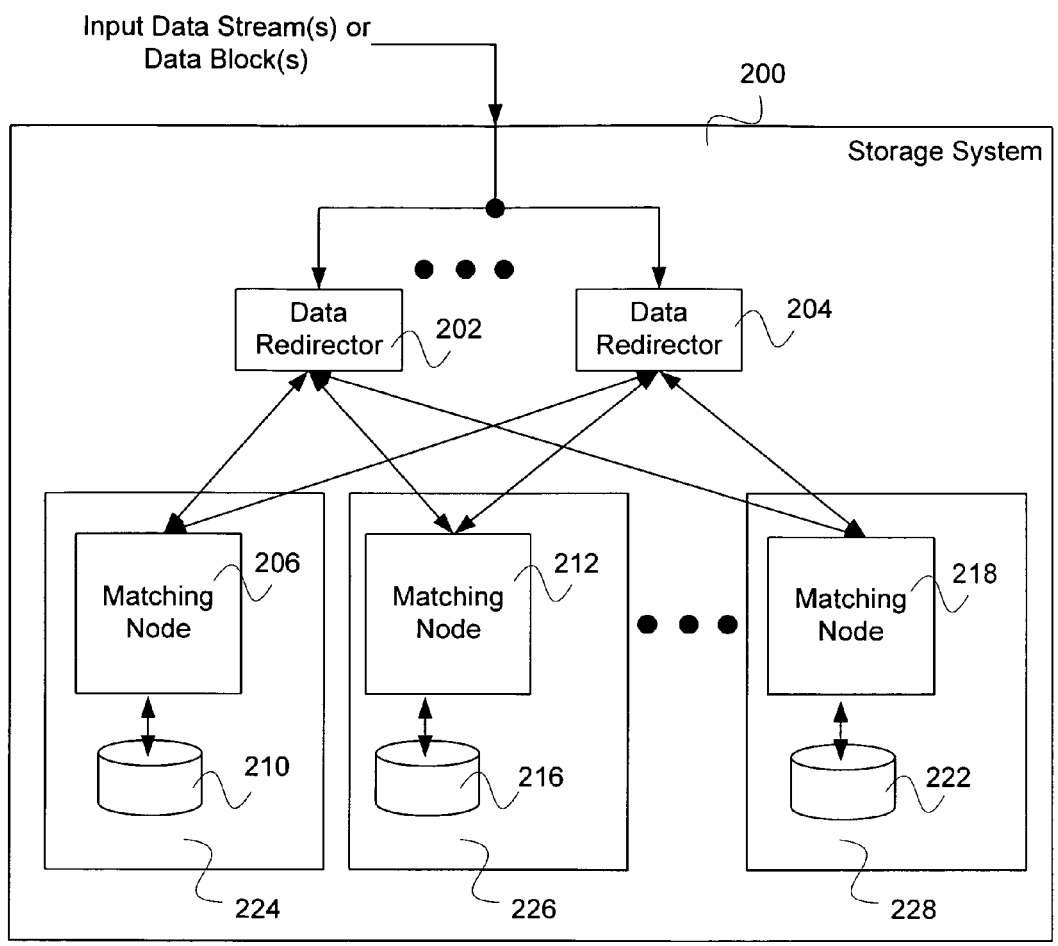
FIG. 2 is a block diagram illustrating a storage system using cluster storage.

FIG. 2 is a block diagram illustrating a storage system using cluster storage. In some embodiments, storage system 200 is used to implement storage system 100 of FIG. 1. In the example shown, storage system 200 receives one or more data streams or data blocks. The data streams or data blocks are processed by a plurality of data redirectors, represented in FIG. 2 by 202 and 204. A data redirector takes an input data stream or data block and breaks up the data stream or block into segments. In some embodiments, a segment is created using an anchoring function in which a hash of a sliding window of bytes is computed; if the hash meets some predetermined criteria, then a boundary between segments is established in an algorithmic way in or around the sliding window. In some embodiments, a window is defined that includes a plurality of smaller windows within which a hash of some of the bytes of each smaller window is calculated and the maximum or minimum hash value within the window is selected to begin a next segment.

In various embodiments, a segment boundary is determined using a value of a function calculated for a plurality of windows within a segmentation window. A plurality of values are computed that are associated with candidate boundaries within the segmentation window. One of the candidate boundaries is selected based at least in part on a comparison between two or more of the computed values. A boundary within the segmentation window is determined. In some embodiments, a segmentation window can be determined by determining a first location corresponding to a minimum segment length and determining a second location corresponding to a maximum length where the segmentation window is the segment from the first location to the second location. Determining a boundary can include determining a plurality of windows within the segmentation window. Each window corresponds to a location within the segmentation window and is associated with a candidate boundary. In some embodiments, a function is then evaluated for each window. The function has as its inputs one or more data values of the window. In various embodiments, the function comprises a hash function, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated—for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is a tie for the value, a criterion of selecting the location that maximizes or minimizes the segment length could be adopted. The boundary may be selected at an offset from one of the above locations, or at fixed-block aligned location near one of the above locations.

In some embodiments, the data redirector may be a software function that runs on the same physical hardware as the clients of the storage system.

In the example shown, cluster node 224 includes matching node 206 and storage device 210; cluster node 226 includes matching node 212 and storage device 216; cluster node 228 includes matching node 218 and storage device 222. Each matching node is responsible for managing a subset of the segments stored in the cluster. Managing a segment includes enabling finding matches or similar segments to a new segment within the other segments being managed, and storing a deduplicated representation of the segment in a storage node. The deduplicated segment is stored by storing a reference to a similar stored segment and a delta or difference between the similar stored segment and the new segment being stored. A segment is transmitted to one or more matching function nodes, represented in FIG. 2 by 206, 212, and 218, of a cluster node, represented in FIG. 2 by 224, 226, and 228, respectively. In some embodiments, the assignment to one or more matching nodes is a function of the hash computed as part of the anchoring function. In some embodiments, the assignment is based on a function of less than all of the bytes in the segments. For example, it could be based on a function of the initial bytes of the segment, of the ending bytes of the segment, or some algorithmically determined sample of the bytes. In some embodiments, the assignment is based on one or more tags of the segment. In various embodiments, a tag comprises a summary feature set, a sketch, a hash or fingerprint of some of the segment, or any other appropriate characterizer of the segment that can be used for assigning the segment to a cluster node. In some embodiments, a summary feature set is determined by selecting a plurality of either fixed length or variable length parts or shingles of a first segment; for each shingle, computing a plurality of values by applying a set of functions to each shingle; and from all the values computed for all the shingles, selecting a first subset of values. In some embodiments, the first subset of values is used in determining resemblance between the first segment and a second segment. In some embodiments, other external factors, such as bytes in neighboring segments or other available resources in a node are used to assign the segment to a matching function node. In some embodiments, the assignment is based on sending one or more tags of the segment to some or all of the matching nodes to determine if the matching node is likely to be able to identify similar segments. In some embodiments, the assignment is based on data maintained in the Data Redirectors about the segments stored on each node such as a summary data structure—for example, a Bloom filter. In some embodiments, a function generates a value for each segment and the Data Redirectors maintain a table which maps a set of such values to each node and a segment is assigned to a node at least in part based on the mapping in such a table.

In some embodiments, other external factors, such as bytes in neighboring segments or other available resources in a node are used to assign the segment to a matching function node. In some embodiments, the assignment of the segment to a matching function node is not dependent on any segment stored on any node in the cluster.

In some embodiments, a node may have already stored a segment similar to the transmitted segment. The transmitted segment is compared to previously stored similar segments to locate a base segment. A reference to the base segment and a delta are stored instead of the transmitted segment. If no similar base segment is located, then the transmitted segment is stored as a new base or possibly as a delta and a new base not identical to the transmitted segment. The new base may not be identical to the transmitted segment if, for example, the transmitted segment contains embedded byte sequences, such as a timestamp, not likely to be repeated in future segments which are otherwise similar. In this case, the embedded byte sequences could be removed from the base and stored in the delta.

In some embodiments, multiple matching nodes may be hosted on the same physical storage device.

In various embodiments, physical storage devices comprise a hard drive, a tape drive, a RAID system, an optical drive, a removable storage device, a network storage device, or any other appropriate storage device. In some embodiments, the storage devices may physically reside in one or more separate nodes. In some embodiments, devices may be shared by a plurality of nodes.

Figure 3A:
FIG. 3A is a block diagram illustrating an embodiment of a data stream or a portion of a data block.

FIG. 3A is a block diagram illustrating an embodiment of a data stream or a portion of a data block. In the example shown, data stream or portion of a data block 300 is shown. Data stream or portion of a data block 300 can be data that is being backed up, data that is being stored, data that is being replicated on a remote site, or any other appropriate data stream or portion of a data block.

Figure 3B:
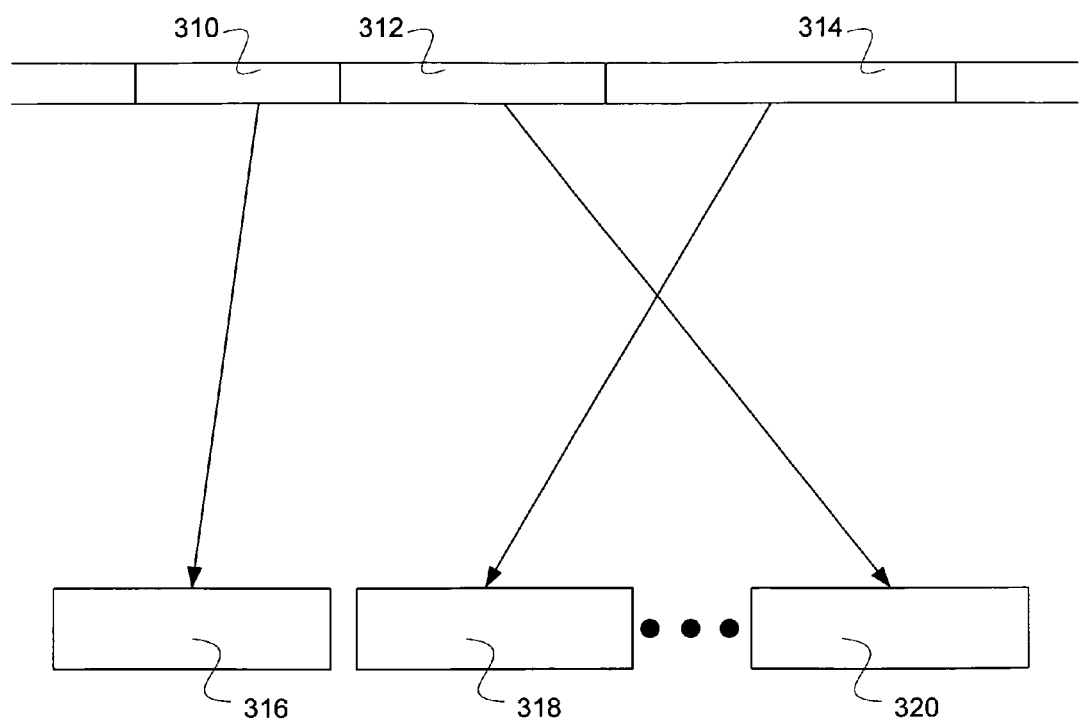
FIG. 3B is a block diagram illustrating an embodiment of segments distributed to cluster nodes.

FIG. 3B is a block diagram illustrating an embodiment of segments distributed to cluster nodes. In some embodiments, cluster nodes 316, 318, and 320 are similar to cluster nodes 224, 226, and 228 of FIG. 2. In the example shown, data stream or portion of a data block is segmented into a plurality of segments—for example, segments 310, 312, and 314. Segmenting of the data stream or portion of the data block can use content-based determination of segment boundaries (e.g., hash of content in a window is equal to a value, or hash of content in a window is the minimum or maximum of the hashes of the content of a set of windows), non-content based determination of segment boundaries (e.g., byte count), file-based segment boundaries, or any other appropriate way of breaking the data stream or data block into segments. In various embodiments, segments are the same size or are different sizes. In various embodiments, the segments may be non-overlapping or overlapping. Segments 310, 312, and 314 are distributed to cluster nodes 316, 318, and 320, respectively. Distribution of a segment to a cluster node is based on the segment content, segment number, metadata associated with the segment, and/or a cluster node having likely similar segments so that efficient storage of the segment can take place. In some embodiments, a tag or other characterization of a segment is distributed to a plurality of nodes, and a given node having likely similar segments can indicate that it would be a good candidate node for the segment to be distributed to.

Figure 4:
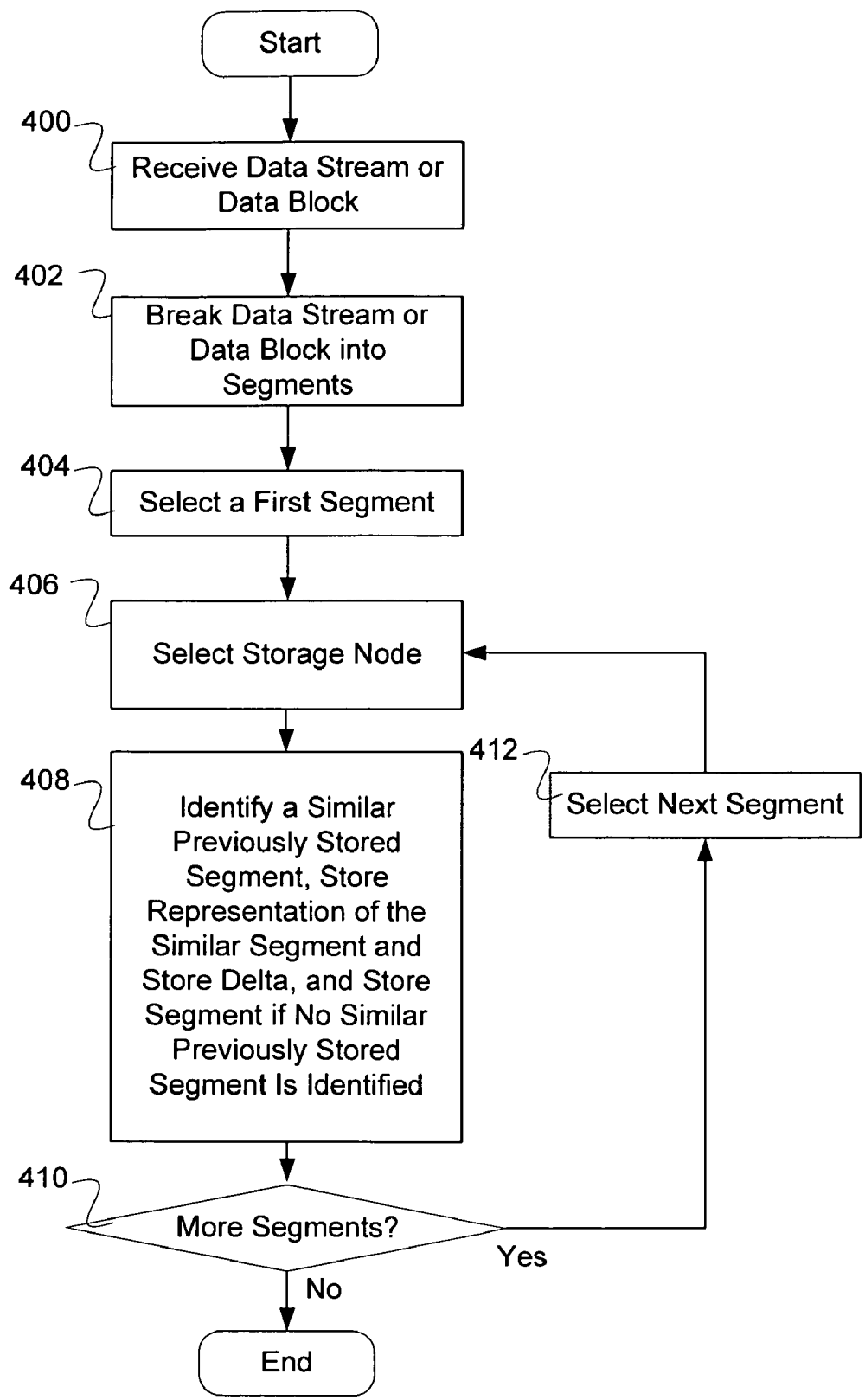
FIG. 4 is a flow diagram illustrating an embodiment of a process for cluster storage.

FIG. 4 is a flow diagram illustrating an embodiment of a process for cluster storage. In some embodiments, the process of FIG. 4 is implemented in storage system 200 of FIG. 2. In the example shown, in 400 a data stream or data block is received. In 402, the data stream or data block is broken into segments. In 404, a first segment is selected. In 406, a storage node is selected. In 408, a similar previously stored segment is identified; representation of the similar previously stored segment and delta are stored; if no similar previously stored segment is identified, store the segment. In some embodiments, if no similar previously stored segment is identified, a base segment and delta are stored for the segment. In 410, it is determined if there are more segments to process. If so, then in 412 a next segment is selected and control passes to 406. If not, then the process ends.

In various embodiments, a segment is associated with a stream, and when the segment is stored on a selected storage node, the segment is stored in such a manner that the segments associated with a stream do not require substantial time (e.g., a long seek time) to be retrieved from the selected storage node. This enables easier (i.e., efficient) retrieval of the stream (e.g., lower retrieval time because the segments associated with a stream are stored close to one another). In various embodiments, new base segments and/or deltas that represent segments associated with a stream are stored in the same storage device, proximal to one another in the same storage device, in the same logical storage unit, or any other appropriate way of storing to enable efficient retrieval. In some embodiments, new base segments and/or deltas that represent segments associated with a stream are stored in the same container. The stream may be associated with a single file, several related files, a directory, a group of related segments, or any other appropriate grouping of data segments. In some embodiments, the data redirector provides an indication of the stream with which the segment is associated to the selected storage node or matching node to which it sends the segment.

In various embodiments, deltas are stored in such a manner that the deltas and the previously stored base segments do not require substantial time (e.g., a long seek) to be retrieved in quick succession. This enables easier reconstruction of a segment from its base segment and delta.

Figure 5:
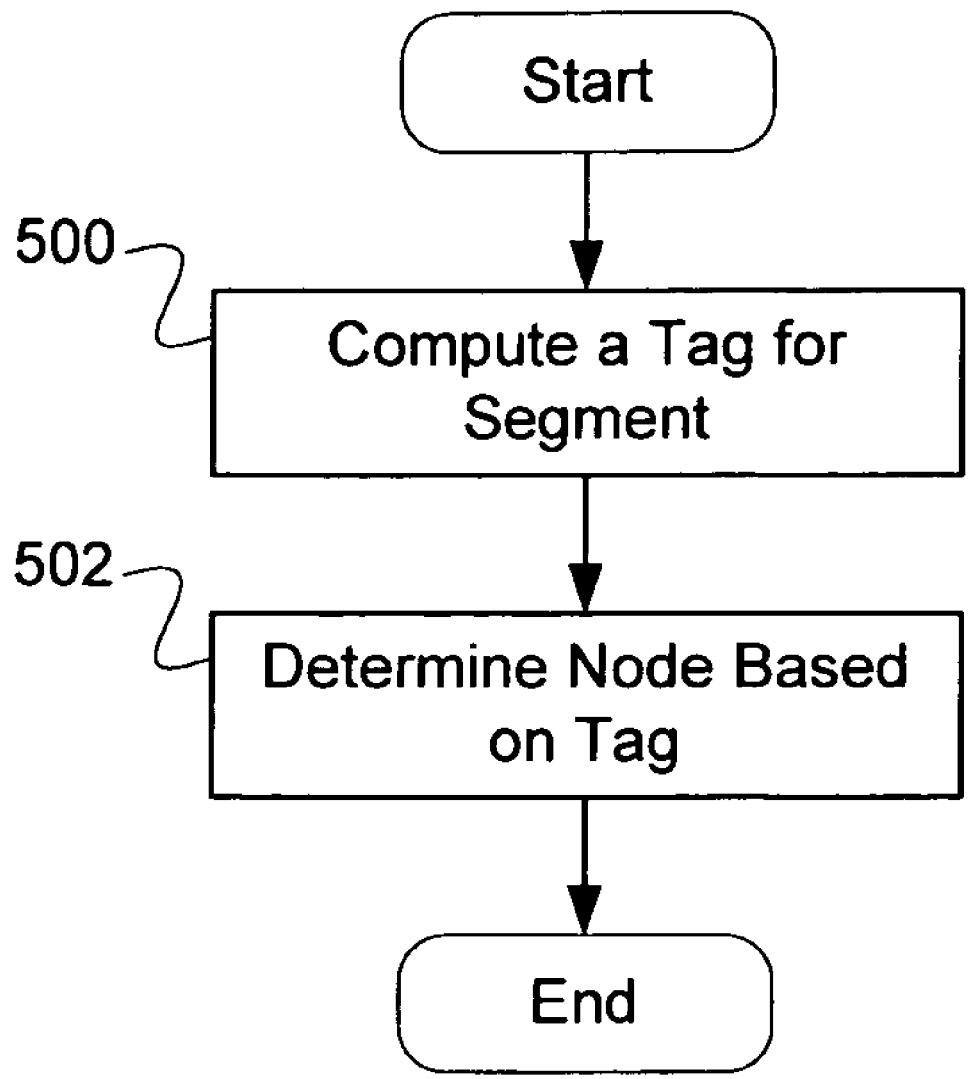
FIG. 5 is a flow diagram illustrating an embodiment of a process for selecting a storage node.

FIG. 5 is a flow diagram illustrating an embodiment of a process for selecting a storage node. In some embodiments, the process of FIG. 5 is used to implement 406 of FIG. 4. In the example shown, in 500 a tag is computed. In 502, a node is selected using the tag. In some embodiments, the segment is assigned to a node based on the tag without consideration of what segments are currently stored in the node; for example, all odd tags (e.g., a hash value) go to node 1, even tags go to node 2. Over time the nodes will have similar segments, but there is actually no check for having similar segments when the node is selected. In some embodiments, a redirector accesses a database or table which maps sets of tag values to each node to determine to which node to assign the segment. In some embodiments, a given node's loading and/or capacity is/are considered in assigning a segment to a given node. In various embodiments, the tag comprises a sketch, a hash, or any other appropriate manner of identifying likely similar segments.

In some embodiments, a redirector compares the tag to a summary data structure (e.g., a Bloom filter) that the redirector is maintaining to determine which node to assign a given segment to.

Figure 6:
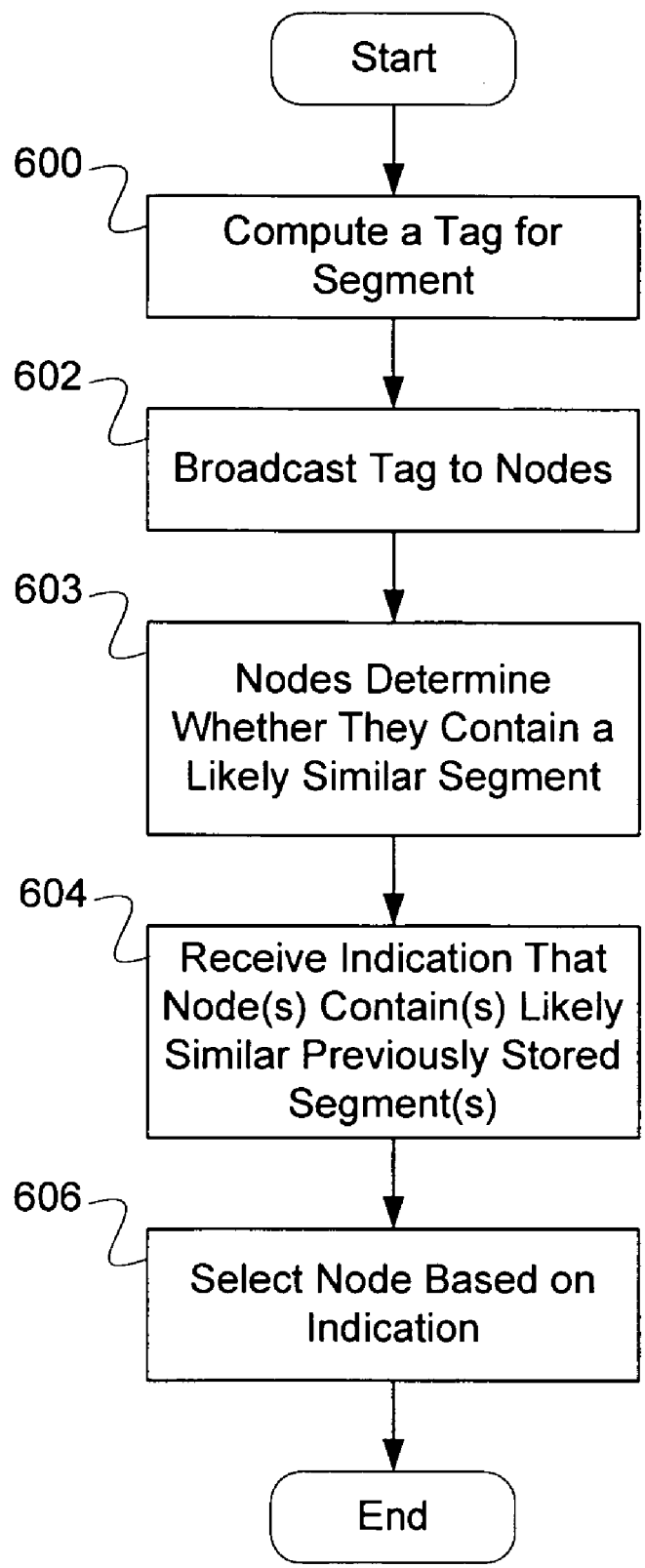
FIG. 6 is a flow diagram illustrating an embodiment of a process for selecting a storage node.

FIG. 6 is a flow diagram illustrating an embodiment of a process for selecting a storage node. In some embodiments, the process of FIG. 6 is used to implement 406 of FIG. 4. In the example shown, in 600 a tag is computed. In 602, the tag is broadcast to all nodes. In some embodiments, the tag is sent to one or more nodes but not all nodes. In some embodiments, the nodes selected to receive the tag are based at least in part on the tag. In 603, the nodes determine whether they contain a likely similar segment. The nodes could use a Bloom filter to determine if they have similar segments. In 604, an indication is received that one or more nodes likely contain(s) similar previously stored segment(s). In 606, a node is selected based on the indication. In some embodiments, the indication indicates a measure of how many likely similar stored segments are stored on a node. In some embodiments, the indication includes information regarding how close a match the likely similar segments may be. In some embodiments, the indication includes information regarding the overall number of stored segments at a given node so that load balancing can be considered in determining assignment of a segment. In various embodiments, the tag comprises a sketch, a hash, or any other appropriate manner of identifying likely similar segments.

Figure 7:
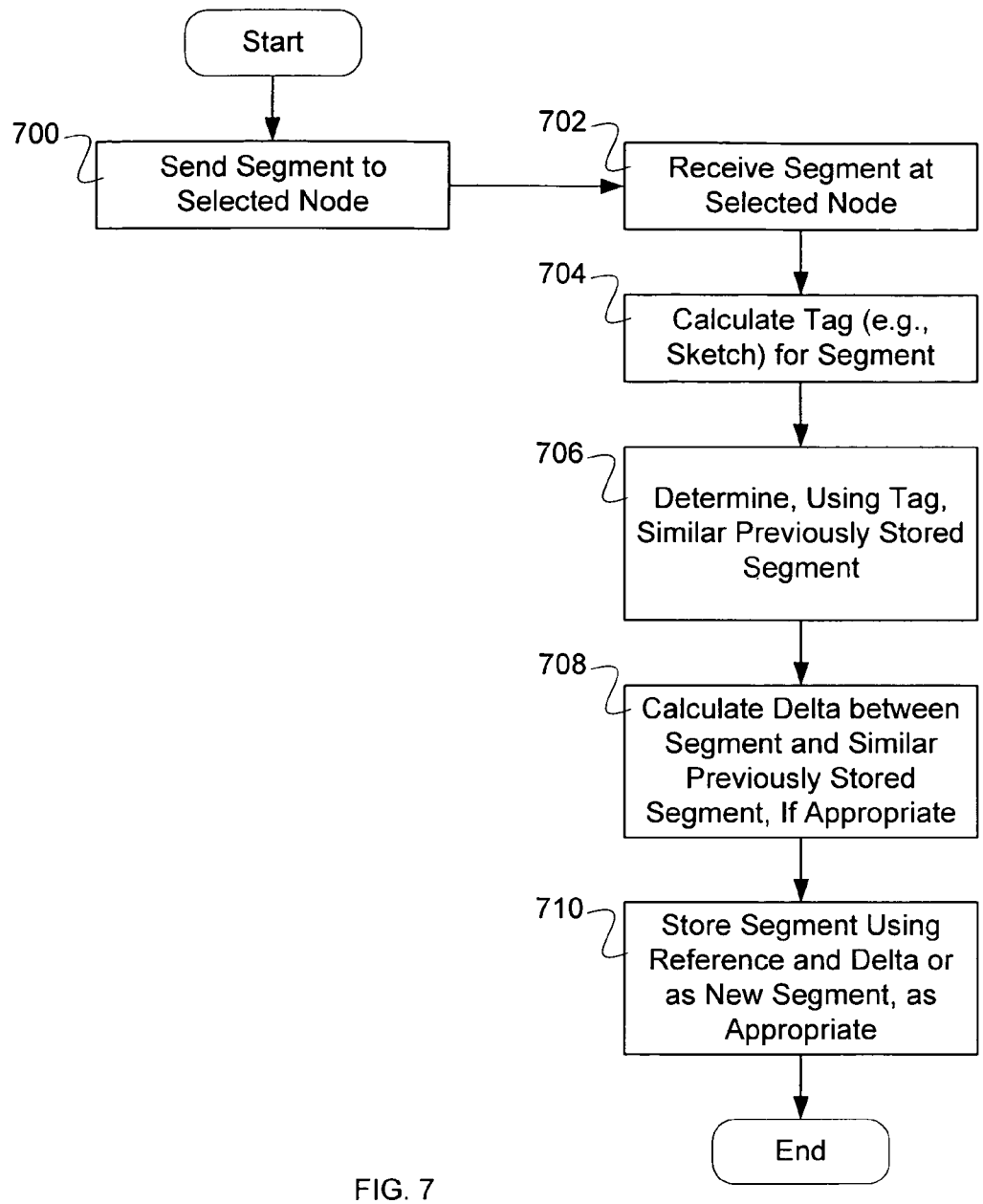
FIG. 7 is a flow diagram illustrating an embodiment of a process for storing a representation of a segment.

FIG. 7 is a flow diagram illustrating an embodiment of a process for storing a representation of a segment. In some embodiments, the process of FIG. 7 is used to implement 408 of FIG. 4. In the example shown, in 700 the segment is sent to the selected node. In 702, the segment is received at the selected node. In 704, a tag (e.g., a sketch) of the segment is calculated. In some embodiments, the tag is the same tag already calculated in 500 or in 600. In 706, it is determined if there is a previously stored similar segment using the tag. In 708 a delta is calculated between the segment and the previously stored similar segment, if appropriate (e.g., if there is a previously stored similar segment). In 710, store segment by storing a reference to the previously stored similar segment and the delta, or store the segment as a new segment. Segment tag(s) is/are stored with segment or with base reference and delta. If a new segment is stored, then tag(s) is/are calculated for the segment to be stored with the segment.

Figure 8:
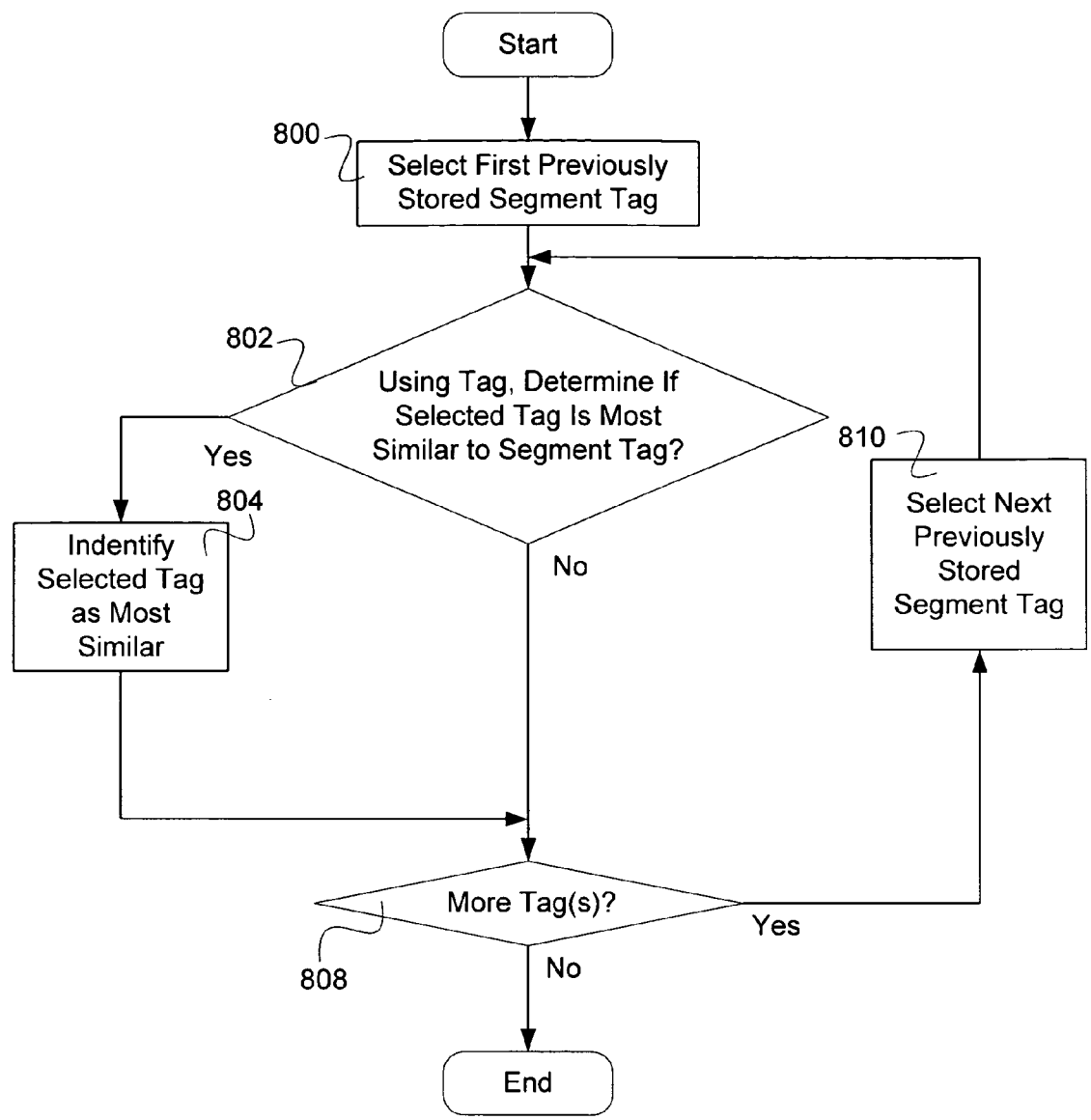
FIG. 8 is a flow diagram illustrating an embodiment of a process for determining if a selected segment is similar to a previously stored segment.

FIG. 8 is a flow diagram illustrating an embodiment of a process for determining if a selected segment is similar to a previously stored segment. In some embodiments, the process of FIG. 8 is used to implement 706 of FIG. 7. In the example shown, in 800 a first previously stored segment tag. In 802, it is determined if the selected tag is most similar to the segment tag. If the selected tag is most similar to the segment tag, then in 804 identify selected tag as most similar, and control passes to 808. If the selected tag is not the most similar to the segment tag, then control passes to 808. In 808, it is determined if there are more tags (e.g., previously stored segment tags). If so, then in 810 a next previously stored segment tag is selected. If not, then the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for cluster storage comprising:
   receiving a data stream or a data block;
   breaking the data stream or the data block into segments; and
   for each segment:
   selecting a cluster node;
   identifying a similar segment to the segment, the similar segment being already managed by the cluster node; and
   in the event the similar segment is identified, causing a reference to the similar segment and a delta between the similar segment and the segment to be stored instead of the segment.

2. The method as in claim 1, further comprising in the event the similar segment is not identified, causing the segment to be stored as a new segment of the cluster node.

3. The method as in claim 2, wherein the new segment is caused to be stored as a new base segment and a new delta.

4. The method as in claim 1, wherein managing a segment includes enabling finding similar segments within the segments being managed.

5. The method as in claim 1, wherein the cluster node manages a portion of the segments stored in the cluster.

6. The method as in claim 1, wherein identifying the similar segment includes using a tag.

7. The method as in claim 6 wherein the tag comprises a sketch.

8. The method as in claim 6, wherein the tag comprises a summary feature set.

9. The method as in claim 6, wherein the tag comprises a hash of some of the segment.

10. The method as in claim 6, wherein the tag comprises a fingerprint of some of the segment.

11. The method as in claim 1, wherein breaking the data stream or the data block into segments is based at least in part on content of the data stream or the data block.

12. The method as in claim 1, wherein breaking the data stream or the data block into segments is based at least in part on file boundaries within the data stream or the data block.

13. The method as in claim 1, wherein breaking the data stream or the data block into segments is based at least in part on an anchoring function, wherein the anchoring function includes determining if the computed hash meets one or more predetermined criteria.

14. The method as in claim 1, wherein breaking the data stream or the data block into segments is based at least in part on an anchoring function, wherein the anchoring function uses a value of a function calculated for a plurality of windows within a segmentation window.

15. The method as in claim 14, where the anchoring function uses a minimum value for the plurality of windows.

16. The method as in claim 14, where the anchoring function uses a maximum value for the plurality of windows.

17. The method as in claim 14, where the anchoring function uses a value with the most 1's for the plurality of windows.

18. The method as in claim 1, wherein breaking the data stream or the data block into segments is based at least in part on an anchoring function, wherein the anchoring function includes establishing a boundary in an algorithmic manner in or around a sliding window of bytes.

19. The method as in claim 1, wherein breaking the data stream or the data block into segments comprises identifying a plurality of segments, wherein the plurality of segments are contiguous or overlapping.

20. The method as in claim 1, wherein selecting the cluster node is based at least in part on a hash of at least a portion of a content of the segment.

21. The method as in claim 1, wherein selecting the cluster node is based at least in part on a sketch of the segment.

22. The method as in claim 1, wherein selecting the cluster node is based at least in part on a content tag associated with the segment.

23. The method as in claim 1, wherein selecting the cluster node is based at least in part on at least a portion of a content of the segment.

24. The method as in claim 1, wherein selecting the cluster node does not depend on a content of any segment previously stored on any cluster node.

25. The method as in claim 1, wherein selecting the cluster node is based at least in part on the cluster node's remaining storage capacity.

26. The method as in claim 1, further comprising storing one or more tags associated with the segment.

27. The method as in claim 1, wherein a plurality of tags associated with a plurality of segments are stored together on a cluster node.

28. The method as in claim 1, wherein the cluster node includes a summary data structure, wherein the summary data structure is used in the process of assigning a segment to a cluster node.

29. The method as in claim 1, wherein selecting the cluster node is based at least in part on one or more segments, wherein the one or more segments are already stored on the node.

30. The method as in claim 1, wherein selecting the cluster node is based at least in part on one or more similar segments already managed by the node.

31. The method as in claim 1, wherein the segment is associated with the data stream and wherein the segment is caused to be stored on the selected cluster node such that the segment can be retrieved efficiently with other segments associated with the data stream, wherein the other segments are stored on the selected cluster node.

32. The method as in claim 31, wherein the data stream associated with the segment comprises one or more of the following: a file, a plurality of related files, a directory of files, or a plurality of related segments.

33. The method as in claim 31, wherein an indication identifying the data stream associated with the segment is provided to the selected cluster node storing the segment.

34. The method as in claim 31, wherein segments associated with the data stream are caused to be stored on the selected cluster node by causing one or more delta and base segment pairs to be stored such that the segments can be retrieved together efficiently.

35. The method as in claim 1, wherein the delta is caused to be stored for efficient retrieval with the similar segment referred to by the reference.

36. The method as in claim 1, wherein the reference and the delta are caused to be stored by the selected cluster node.

37. The method as in claim 1, wherein the reference and the delta are caused to be stored by a replica system.

38. A system for cluster storage comprising:
   a processor; and
   a memory coupled with the processor, wherein the memory is configured to provide the processor with instructions which when executed cause the processor to:
   receive a data stream or a data block;
   break the data stream or the data block into segments; and for each segment:
- select a cluster node;
- identify a similar segment to the segment, the similar segment being already managed by the cluster node; and
- in the event the similar segment is identified, cause a reference to the similar segment and a delta between the similar segment and the segment to be stored instead of the segment.

39. The system as in claim 38, wherein the processor comprises a client processor.

40. The system as in claim 38, wherein the reference and the delta are caused to be stored by the selected cluster node.

41. The system as in claim 38, wherein the reference and the delta are caused to be stored by a replica system.

42. A computer program product for cluster storage, the computer program product being embodied in a computer readable storage medium and comprising computer instructions for:
- receiving a data stream or a data block;
- breaking the data stream or the data block into segments; and
- for each segment:
  - selecting a cluster node;
  - identifying a similar segment to the segment, the similar segment being already managed by the cluster node; and
  - in the event the similar segment is identified, causing a reference to the similar segment and a delta between the similar segment and the segment to be stored instead of the segment.

* * * * *